(12) United States Patent
Childs

(10) Patent No.: US 12,259,009 B2
(45) Date of Patent: Mar. 25, 2025

(54) TOLERANCE RING, ASSEMBLY, AND METHOD OF MAKING AND USING THE SAME

(71) Applicant: SAINT-GOBAIN PERFORMANCE PLASTICS RENCOL LIMITED, Coventry (GB)

(72) Inventor: Thomas Childs, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 939 days.

(21) Appl. No.: 17/419,172

(22) PCT Filed: Dec. 31, 2019

(86) PCT No.: PCT/EP2019/087184
§ 371 (c)(1),
(2) Date: Jun. 28, 2021

(87) PCT Pub. No.: WO2020/141169
PCT Pub. Date: Jul. 9, 2020

(65) Prior Publication Data
US 2022/0106986 A1    Apr. 7, 2022

Related U.S. Application Data

(60) Provisional application No. 62/786,878, filed on Dec. 31, 2018.

(51) Int. Cl.
*F16D 1/08* (2006.01)
*F16D 1/06* (2006.01)
*F16D 7/02* (2006.01)

(52) U.S. Cl.
CPC ...... *F16D 1/0835* (2013.01); *F16D 2001/062* (2013.01); *F16D 7/021* (2013.01);
(Continued)

(58) Field of Classification Search
CPC .. F16D 1/0835; F16D 7/021; F16D 2001/062; F16D 2200/0021;
(Continued)

(56) References Cited

U.S. PATENT DOCUMENTS 9,028,165 B2 * 5/2015 Nias ........................ F16C 27/04
403/372
9,869,330 B2 * 1/2018 Kinoshita ................. F16B 2/00
(Continued)

FOREIGN PATENT DOCUMENTS

CN        103492734 A    1/2014
CN        104350299 A    2/2015
(Continued)

OTHER PUBLICATIONS

International Search Report and Written Opinion for PCT/EP2019/087184, mailed May 26, 2020, 17 pages.
(Continued)

*Primary Examiner* — Daniel J Wiley
(74) *Attorney, Agent, or Firm* — Abel Schillinger, LLP; Ann Palma

(57) ABSTRACT

A tolerance ring (200) including a tolerance ring sidewall (404) including a plurality of waves (or bridges) (452) extending at least one of radially inward or outward and having first (416) and second end portions (420) terminating at first (417) and second ends (421), respectively, where the tolerance ring has a first radius of curvature $R_1$, measured at a point bisecting a circumferential length, $L_C$, of the tolerance ring sidewall, and a second radius of curvature, $R_2$, measured along one of the first and second end portions of the tolerance ring sidewall, and wherein at least one of: 1) $R_1$ is greater than $R_2$, or 2) wherein $R_1$ is negative and $R_2$ is positive.

13 Claims, 6 Drawing Sheets

(52) U.S. Cl.
CPC ............... *F16D 2200/0021* (2013.01); *F16D 2250/0046* (2013.01); *F16D 2300/0212* (2013.01); *F16D 2300/10* (2013.01)

(58) Field of Classification Search
CPC ..... F16D 2250/0046; F16D 2300/0212; F16D 2300/10
See application file for complete search history.

(56) References Cited

U.S. PATENT DOCUMENTS

| | | |
|---|---|---|
| 2008/0043374 A1 | 2/2008 | Hanrahan et al. |
| 2010/0003076 A1 | 1/2010 | Slayne |
| 2014/0016999 A1 | 1/2014 | Kinoshita et al. |
| 2014/0147199 A1 | 5/2014 | Tajima et al. |
| 2015/0114549 A1 | 4/2015 | Slayne et al. |
| 2015/0354637 A1 | 12/2015 | Slayne |
| 2018/0072342 A1 | 3/2018 | Brochot et al. |
| 2018/0283457 A1 | 10/2018 | Plioska et al. |
| 2018/0306248 A1* | 10/2018 | Itta .......................... F16D 7/021 |
| 2019/0101163 A1* | 4/2019 | Haines .................. F16D 1/0835 |
| 2019/0190345 A1* | 6/2019 | Childs ....................... F16F 1/37 |
| 2020/0025256 A1* | 1/2020 | Pickering .............. F16D 1/0835 |

FOREIGN PATENT DOCUMENTS

| | | |
|---|---|---|
| GB | 895787 A | 5/1962 |
| JP | 2000262978 A | 9/2000 |
| WO | 2020141169 A1 | 7/2020 |

OTHER PUBLICATIONS

Toleranzringe, www.boschrexroth.com, R310DE 2970 (Dec. 2004), 32 pages.

Smith, Tolerance Rings, IEEE Industry Applications Magazine (Sep.-Oct. 2002), www.ieee.org/ias, accessed May 26, 2020, 9 pages.

* cited by examiner

| Radius Profile (Stepped) | |
|---|---|
| Position | Radius of Curvature |
| 0 | NA |
| 40 | -450 |
| 100 | 400 |
| 160 | 140 |
| 220 | 85 |

TOLERANCE RING, ASSEMBLY, AND METHOD OF MAKING AND USING THE SAME

CROSS-REFERENCE TO RELATED APPLICATIONS

This application is a National Stage entry under 35 U.S.C. § 371 of International Application No. PCT/EP2019/087184, filed Dec. 31, 2019, entitled "TOLERANCE RING, ASSEMBLY, AND METHOD OF MAKING AND USING THE SAME," by Thomas CHILDS, which claims priority to U.S. Provisional Patent Application No. 62/786,878, filed Dec. 31, 2018, entitled "TOLERANCE RING, ASSEMBLY, AND METHOD OF MAKING AND USING THE SAME," by Thomas CHILDS, both of which applications are assigned to the current assignee hereof and incorporated herein by reference in their entireties.

TECHNICAL FIELD

The present disclosure relates to tolerance rings, tolerance ring assemblies, and more particularly to tolerance ring packaging, installation, and use within assemblies.

BACKGROUND ART

Generally, tolerance rings are known devices that provide an interference fit between two neighboring components that may not be machined to exact dimensions within an assembly adapted to transmit torque, such as motor, alternator, pump, steering, or hard disk drive assemblies. In particular, a tolerance ring provides an interference fit between a cylindrical component such as a shaft and a housing component for the shaft. Tolerance rings have a number of other potential advantages, such as compensating for different coefficients of expansion between the parts, allowing rapid apparatus assembly, and durability.

Typically, tolerance rings include a strip of resilient material, for example a metal, the ends of which are brought together or overlapped to form a ring or a substantially full circle with a gap between the ends. For some rings, the resulting gap may be large such that the rings may become entangled during use, packaging, and shipment, potentially damaging the tolerance rings and increasing manual workload for users. Therefore, there continues to be a need for tolerance rings that provide adequate performance in assemblies, but allow for easier use, packaging, assembly, and shipment.

BRIEF DESCRIPTION OF THE DRAWINGS

Embodiments are illustrated by way of example and are not limited in the accompanying figures.

Figure 1:
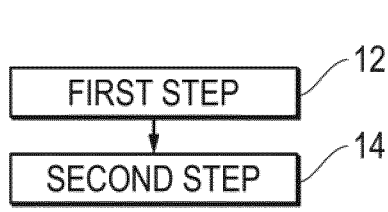
FIG. 1 includes a method of producing a tolerance ring in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring and tolerance ring assembly arts.

Embodiments described herein are generally directed to a tolerance ring and methods of creating and using a tolerance ring within an assembly. In particular embodiments, the tolerance ring may have a tolerance ring sidewall including a plurality of waves extending at least one of radially inward or outward and having first and second end portions terminating at first and second ends, respectively, where the tolerance ring has a first radius of curvature, $R_1$, measured at a point bisecting a circumferential length, $L_c$, of the tolerance ring sidewall, and a second radius of curvature, $R_2$, measured along one of the first and second end portions of the tolerance ring sidewall, and wherein at least one of: 1) $R_1$ is greater than $R_2$, or 2) wherein $R_1$ is negative and $R_2$ is positive. In other particular embodiments, the tolerance ring may have a tolerance ring sidewall including a plurality of waves extending at least one of radially inward or outward and having first and second end portions terminating at first and second ends respectively, where in an uninstalled, unbiased state the tolerance ring has a circumference that spans 180° or less, and where in an installed state the tolerance ring deforms upon deployment between an inner member and an outer member to have a circumference that spans at least 300°. In other particular embodiments, the tolerance ring may be a part of a packaged article including a package; and a plurality of tolerance rings nested in the package, where the tolerance rings each include a plurality of waves extending at least one of radially inward or outward and having first and second end portions terminating at first and second ends, respectively, where each tolerance ring has a circumference that spans 180° or less. In other particular embodiments, the tolerance ring may be a part of an assembly including an inner member, an outer member a tolerance ring disposed between the inner member and the outer member, the tolerance ring including a tolerance ring sidewall including a plurality of waves extending at least one of radially inward or outward and having first and second end portions terminating at first and second ends, respectively, where in an uninstalled, unbiased state, the tolerance ring has a circumference that spans 180° or less, and where in an installed state the tolerance ring deforms upon deployment between the inner member and the outer member to have a circumference that spans at least 300°. In other particular embodiments, the tolerance ring may be a part of a method including providing an inner member, providing an outer member, providing a tolerance ring between the inner member and the outer member, the tolerance ring including a tolerance ring sidewall including a plurality of waves extending at least one of radially inward or outward and having first and second end portions terminating at first and second ends, respectively, where in an uninstalled, unbiased state the tolerance ring has a circumference that spans 180° or less, and deforming the tolerance ring upon deployment between the inner member and the outer member to have a circumference that spans at least 300°.

For purposes of illustration, FIG. 1 includes a diagram showing a forming process 10 for forming a tolerance ring. The forming process 10 may include a first step 12 of providing a material or composite material including a substrate. Optionally, the forming process 10 may further include a second step 14 of curling the ends of the material or composite material to form a tolerance ring.

Figure 2A:
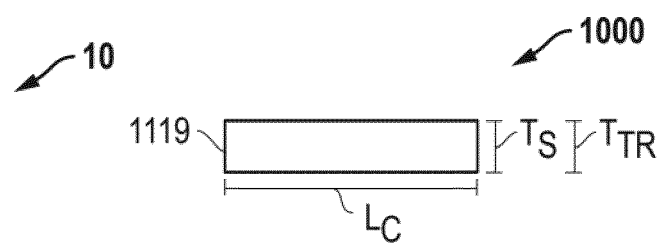
FIG. 2A includes a cross-sectional view of a tolerance ring in accordance with an embodiment.

FIG. 2A includes an illustration of a material 1000 that may be formed into the tolerance ring of the first step 12 of the forming process 10. The tolerance ring may include a substrate 1119. In an embodiment, the substrate 1119 can at least partially include a metal. According to certain embodiments, the metal may include iron, copper, titanium, tin, aluminum, alloys thereof, or may be another type of metal. More particularly, the substrate 1119 can at least partially include a steel, such as, a stainless steel, carbon steel, or spring steel. For example, the substrate 1119 can at least partially include a 301 stainless steel. The 301 stainless steel may be annealed, ¼ hard, ½ hard, ¾ hard, or full hard. Moreover, the steel can include stainless steel including chrome, nickel, or a combination thereof. For example, the steel can 10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967. In another aspect, the steel can include carbon steel. The substrate 1119 may be formed by at least one of chamfering, turning, reaming, forging, extruding, molding, sintering, rolling, or casting.

The substrate 1119 can have a thickness Ts of between about 1 micron to about 1000 microns, such as between about 50 microns and about 500 microns, such as between about 100 microns and about 250 microns, such as between about 75 microns and about 150 microns. In a number of embodiments, the substrate 1119 may have a thickness Ts of between about 100 and 500 microns. In a number of embodiments, the substrate 1119 may have a thickness Ts of between about 350 and 450 microns. It will be further appreciated that the thickness Ts of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different than a thickness at a second location therealong.

Figure 2B:
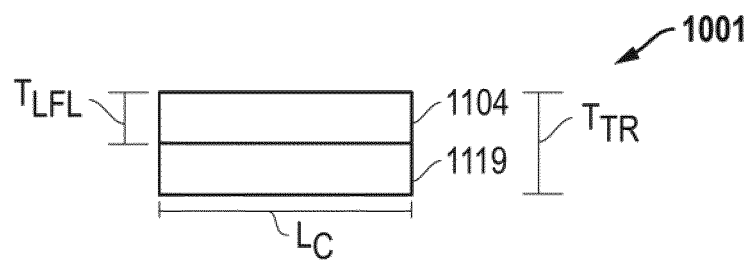
FIG. 2B includes a cross-sectional view of a tolerance ring in accordance with an embodiment.

FIG. 2B includes an illustration of a composite material 1001, alternative to the material 1000, that may be formed into the tolerance ring of the first step 12 of the forming process 10. For purposes of illustration, FIG. 2B shows the layer by layer configuration of a composite material 1001 of the tolerance ring. In a number of embodiments, the composite material 1001 may include substrate 1119 (as mentioned above) and coating 1104 overlying the substrate 1119. In a more particular embodiment, the composite material 1001 may include a substrate 1119 and a plurality of one coatings 1104 overlying the substrate 1119. As shown in FIG. 2B, the coating 1104 can be coupled to at least a portion of the substrate 1119. In a particular embodiment, the coating 1104 can be coupled to a surface of the substrate 1119 so as to form an interface with another surface of another component. The coating 1104 can be coupled to the radially inner surface of the substrate 1119. Alternatively, the coating 1104 can be coupled to the radially outer surface of the substrate 1119.

In a number of embodiments, the coating 1104 can include a damping material. The damping material can include natural polyisoprene, synthetic polyisoprene, polybutadiene, chloroprene rubber, butyl rubber, styrene-butadiene rubber, nitrile rubber, ethylene propylene, rubber, ephichlorohydrin rubber, polyacrylic rubber, silicone rubber, fluorosilicone rubber, fluoroelastomers, perfluoroelastomers, polyether block amides, bitumen, polyethylene, chlorosulfonated polyethylene, ethyl-vinyl acetate (EVA), EVA foam, low-density polyethylene foam, nitrile rubber foam, polychloroprene foam, polyimide foam, polypropylene foam, polyurethane foam, polystyrene foam, polyvinyl chloride foam, silicone foam, foam rubber, polyurethane foam, XPS foam, epoxy foam, phenolic foam, or any combination thereof. The damping layer 104 may include a solid based material including lithium soap, latex, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof.

In a number of embodiments, the coating 1104 can include a heat transfer material. The heat transfer material can include a metal. According to certain embodiments, the metal may include iron, copper, titanium, tin, aluminum, magnesium, graphene, alloys thereof, or may be another type of metal. In a number of embodiments, the coating 1104 can include a high friction material. The high friction material can include aluminum flake paint, mechanical zinc, silicone, an adhesive (including those listed for the adhesive layer below), or may be another type of high friction material.

In a number of embodiments, the coating 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the coating 1104 can have a thickness $T_{LFL}$ of between about 1 micron to about 500 microns, such as between about 10 microns and about 250 microns, such as between about 30 microns and about 150 microns, such as between about 40 microns and about 100 microns. In a number of embodiments, the coating 1104 may have a thickness $T_{LFL}$ of between about 50 and 250 microns. It will be further appreciated that the thickness $T_{LFL}$ of the coating 1104 may be any value between any of the minimum and maximum values noted above. The thickness of the coating 1104 may be uniform, i.e., a thickness at a first location of the coating 1104 can be equal to a thickness at a second location therealong. The thickness of the coating 1104 may be non-uniform, i.e., a thickness at a first location of the coating 1104 can be different than a thickness at a second location therealong. It can be appreciated that different coatings 1104 may have different thicknesses. The coating 1104 may overlie one major surface of the substrate 1119, shown, or overlie both major surfaces. The substrate 1119 may be at least partially encapsulated by the coating 1104. That is, the coating 1104 may cover at least a portion of the substrate 1119. Axial surfaces of the substrate 1119 may be exposed from the coating 1104.

Figure 2C:
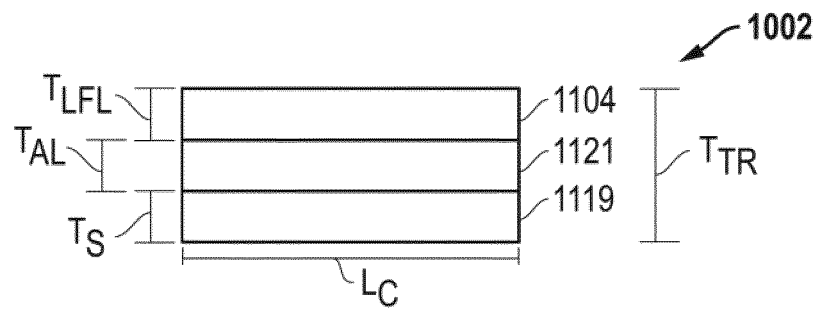
FIG. 2C includes a cross-sectional view of a tolerance ring in accordance with an embodiment.

FIG. 2C includes an illustration of an alternative embodiment of the composite material 1002, alternative to the materials 1000, 1001, that may be formed into the tolerance ring of the first step 12 of the forming process 10. For purposes of illustration, FIG. 2C shows the layer by layer configuration of a composite material 1002 of the tolerance ring. According to this particular embodiment, the composite material 1002 may be similar to the composite material 1001 of FIG. 2B, except this composite material 1002 may also include at least one adhesive layer 1121 that may couple the coating 1104 to the substrate 1119 and a coating 1104. In another alternate embodiment, the substrate 1119, as a solid component, woven mesh or expanded metal grid, may be embedded between at least one adhesive layer 1121 included between the coating 1104 and the substrate 1119.

The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness $T_{AL}$ of between about 1 micron to about 500 microns, such as between about 10 microns and about 250 microns, such as between about 30 microns and about 150 microns, such as between about 40 microns and about 100 microns. In a number of embodiments, the adhesive layer 1121 may have a thickness $T_{AL}$ of between about 50 and 250 microns. In a number of embodiments, the adhesive layer 1121 may have a thickness $T_{AL}$ of between about 80 and 120 microns. It will be further appreciated that the thickness $T_{AL}$ of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different than a thickness at a second location therealong.

Figure 2D:
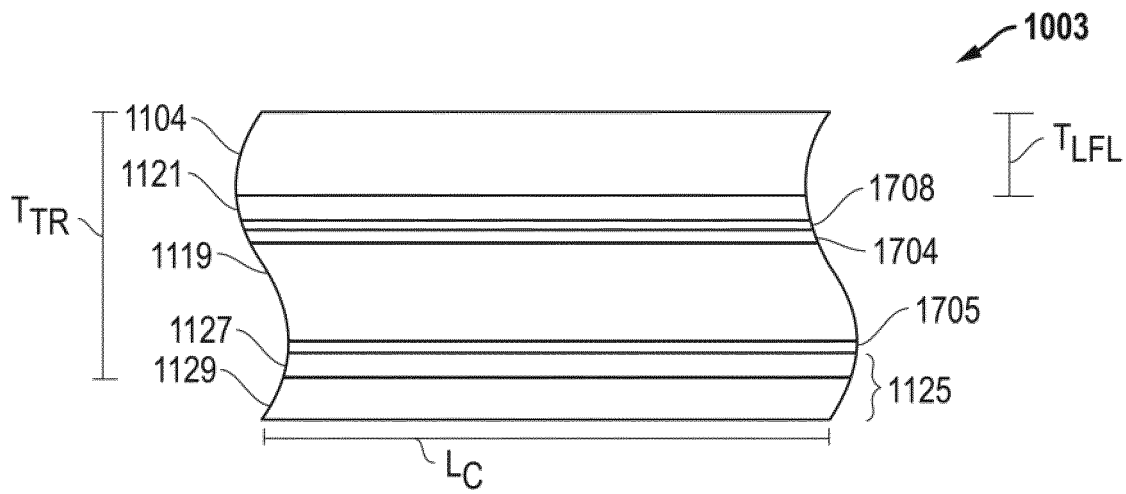
FIG. 2D includes a cross-sectional view of a tolerance ring in accordance with an embodiment.

FIG. 2D includes an illustration of an alternative embodiment of the composite material 1003, alternative to the materials 1000, 1001, 1002, that may be formed into the tolerance ring of the first step 12 of the forming process 10. For purposes of illustration, FIG. 2D shows the layer by layer configuration of a composite material 1003 of the tolerance ring. According to this particular embodiment, the composite material 1003 may be similar to the composite material 1002 of FIG. 2B, except this composite material 1003 may also include at least one corrosion protection layer 1704, 1705, and 1708, and a corrosion resistant coating 1124 that can include an adhesion promoter layer 1127 and an epoxy layer 1129 that may couple to the substrate 1119 and a coating 1104.

The substrate 1119 may be coated with corrosion protection layers 1704 and 1705 including corrosion protection material to prevent corrosion of the composite material 1003 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include corrosion protection materials including a phosphate of zinc, iron, manganese, or any combination thereof, or a nano-ceramic layer. Further, layers 1704 and 1705 can include corrosion protection materials including functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

As stated above, the composite material 1003 may further include a corrosion resistant coating 1125. The corrosion resistant coating 1125 can have a thickness of about 1 to 50 microns, such as about 5 to 20 microns, and such as about 7 to 15 microns. The corrosion resistant coating 1125 can include an adhesion promoter layer 1127 and an epoxy layer 1129. The adhesion promoter layer 1127 can include corrosion protection materials including phosphate of zinc, iron, manganese, tin, or any combination thereof, or a nano-ceramic layer. The adhesion promoter layer 1127 can include corrosion protection materials including functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer 1127 can be applied by spray coating, e-coating, dip spin coating, electrostatic coating, flow coating, roll coating, knife coating, coil coating, or the like.

The epoxy layer 1129 can be corrosion protection materials including a thermal cured epoxy, a UV cured epoxy, an IR cured epoxy, an electron beam cured epoxy, a radiation cured epoxy, or an air cured epoxy. Further, the epoxy layer 1129 can include corrosion protection materials including polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners such as chromium, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above. In an embodiment, the epoxy layer 1129 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the composite material as compared to a composite material without conductive fillers. In an embodiment, the epoxy layer 1129 can be applied by spray coating, e-coating, dip spin coating, electrostatic coating, flow coating, roll coating, knife coating, coil coating, or the like. Additionally, the epoxy layer 1129 can be cured, such as by thermal curing, UV curing, IR curing, electron beam curing, irradiation curing, or any combination thereof. Preferably, the curing can be accomplished without increasing the temperature of the component above the breakdown temperature of any of the coating 1104, the adhesive layer 1121, the substrate 1119, or the adhesion promoter layer 1127. Accordingly, the epoxy may be cured below about 250° C., even below about 200° C.

In an embodiment, under step 12 of FIG. 1, any of the layers on the material or composite material 1000, 1001, 1002, 1003, as described above, can each be disposed in a roll and peeled therefrom to join together under pressure, at elevated temperatures (hot or cold pressed or rolled), by an adhesive, or by any combination thereof. Any of the layers of the material or composite material 1000, 1001, 1002, 1003, as described above, may be laminated together such that they at least partially overlap one another. Any of the layers on the material or composite material 1000, 1001, 1002, 1003, as described above, may be applied together using coating technique, such as, for example, physical or vapor deposition, spraying, plating, powder coating, or through other chemical or electrochemical techniques. In a particular embodiment, the coating 1104 may be applied by a roll-to-roll coating process, including for example, extrusion coating. The coating 1104 may be heated to a molten or semi-molten state and extruded through a slot die onto a major surface of the substrate 1119. In another embodiment, the coating 1104 may be cast or molded. In an embodiment, the material or composite material 1000, 1001, 1002, 1003, may be a single unitary strip of material.

In other embodiments, under step 12 of FIG. 1, any of the layers on the material or composite material 1000, 1001, 1002, 1003, as described above, may be applied by a coating technique, such as, for example, physical or vapor deposition, spraying, plating, powder coating, or through other chemical or electrochemical techniques. In a particular embodiment, the coating 1104 may be applied by a roll-to-roll coating process, including for example, extrusion coating. The coating 1104 may be heated to a molten or semi-molten state and extruded through a slot die onto a major surface of the substrate 1119. In another embodiment, the coating 1104 may be cast or molded.

In an embodiment, the coating 1104 or any layers can be glued to the substrate 1119 using the melt adhesive layer 1121 to form a laminate. In an embodiment, any of the intervening or outstanding layers on the material or composite material 1000, 1001, 1002, 1003, may form the laminate. The laminate can be cut into strips or blanks that can be formed into the tolerance ring. The cutting of the laminate may include use of a stamp, press, punch, saw, or may be machined in a different way. Cutting the laminate can create cut edges including an exposed portion of the substrate 1119.

In an embodiment, under step 14 of FIG. 1, the blanks can be formed into the tolerance ring by curling the ends of the laminate strip or blank. The tolerance ring may be formed by stamp, press, punch, saw, rolling, flanging, or may be machined in a different way.

Figure 3:
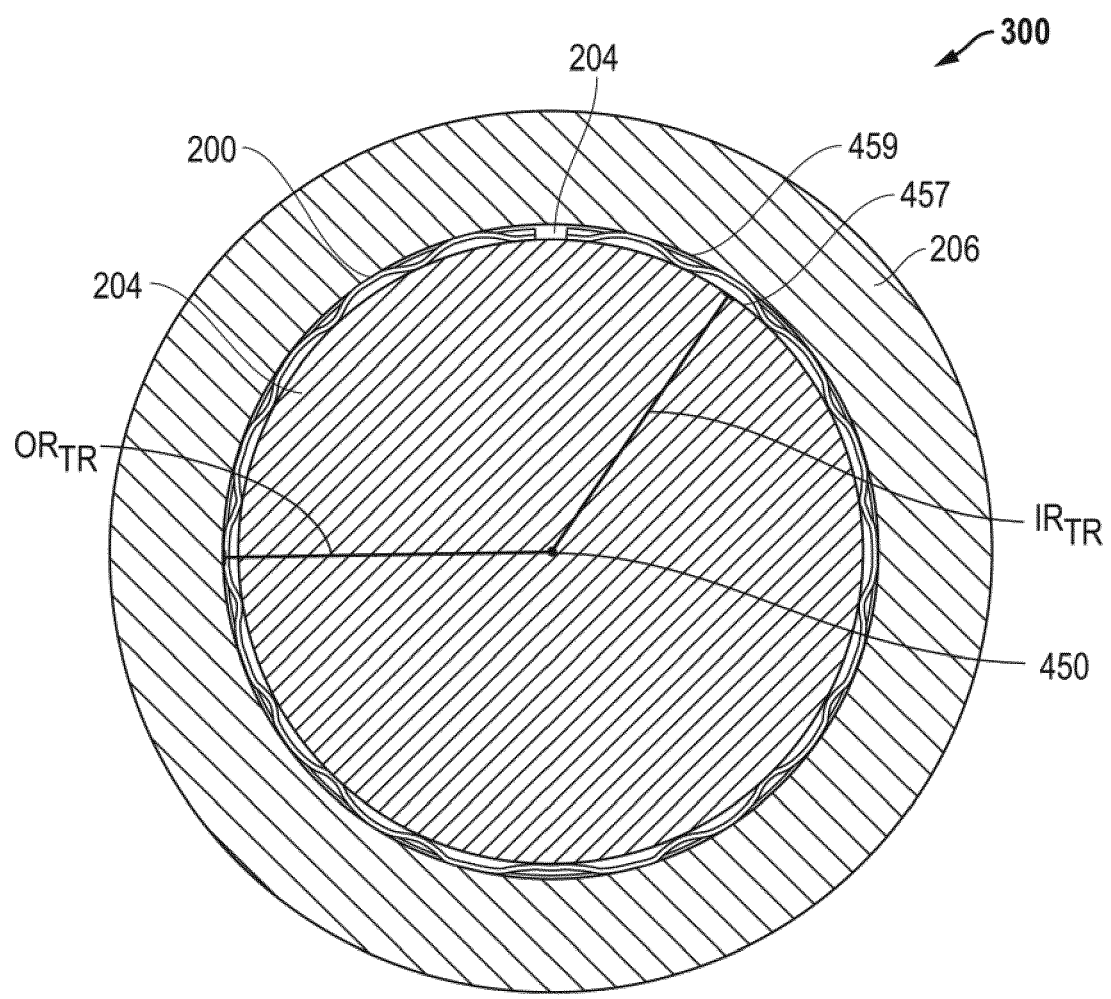
FIG. 3 includes a top view of an assembled tolerance ring within an assembly in accordance with an embodiment.

Turning now to the tolerance ring formed according to embodiments described herein, FIG. 3 includes a top view illustration of a tolerance ring 200 within an assembly 500. The assembly 500 may further include an inner member 204 and an outer member 206. As illustrated in FIG. 3, and described in greater detail below, a tolerance ring 200 can be installed or disposed between the inner member 204 and the outer member 206 within an assembly 500. Specifically, the outer member 206 may be formed with a bore 202 and the inner member 204 can be installed within the bore 202. Further, the tolerance ring 200 can be installed between the inner member 204 and the outer member 206 within the bore 202. The tolerance ring 200 can be configured to engage the inner wall of the outer member 206 at the bore 202, and the outer wall of the inner member 204 in order to maintain the inner member 204 within the outer member 206 in an interference fit. The tolerance ring 200 can account for dimensional variations by at least partially deforming or compressing between the inner member 204 and the outer member 206 within the bore 202 during and after installation.

Figure 4A:
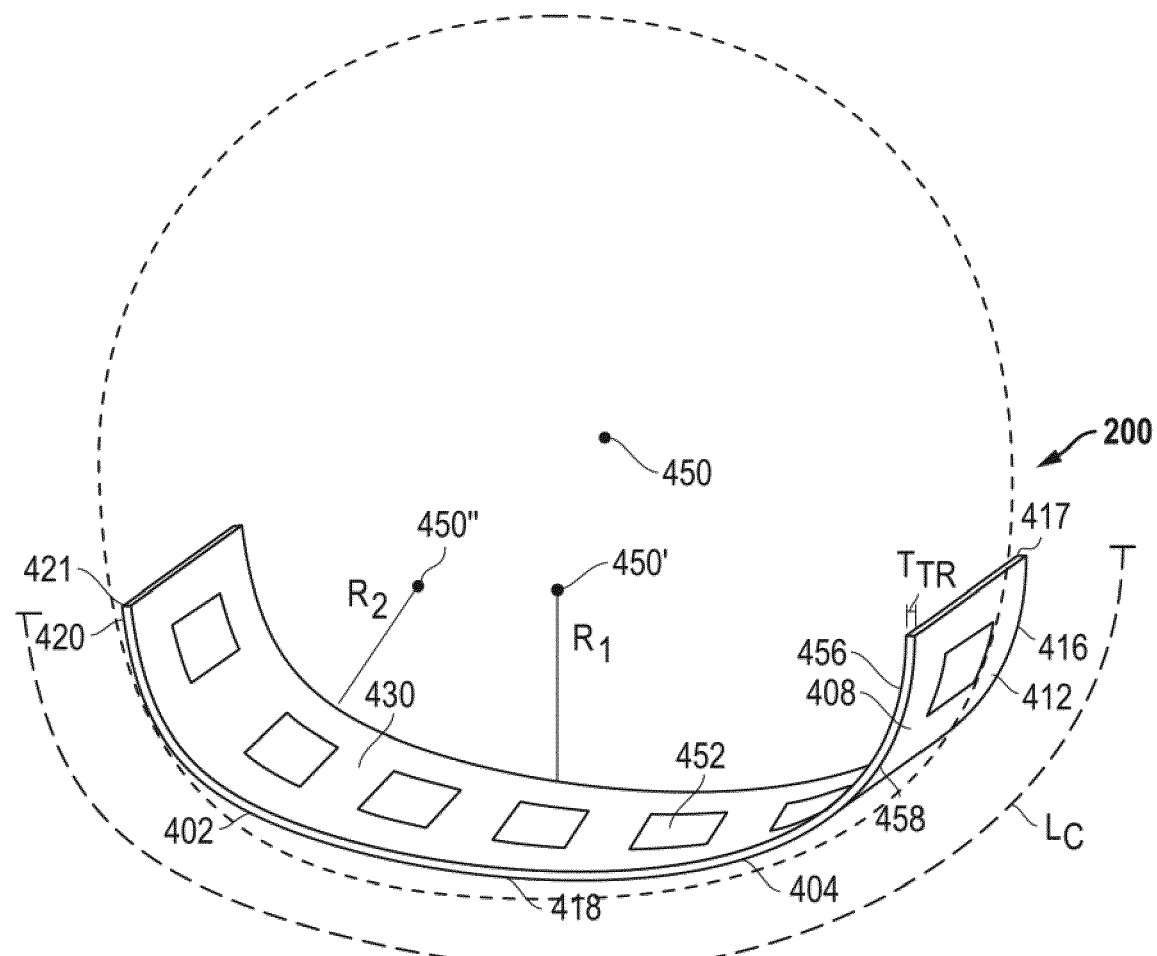
FIG. 4A includes a side perspective view of a tolerance ring in accordance with an embodiment.
Figure 4B:
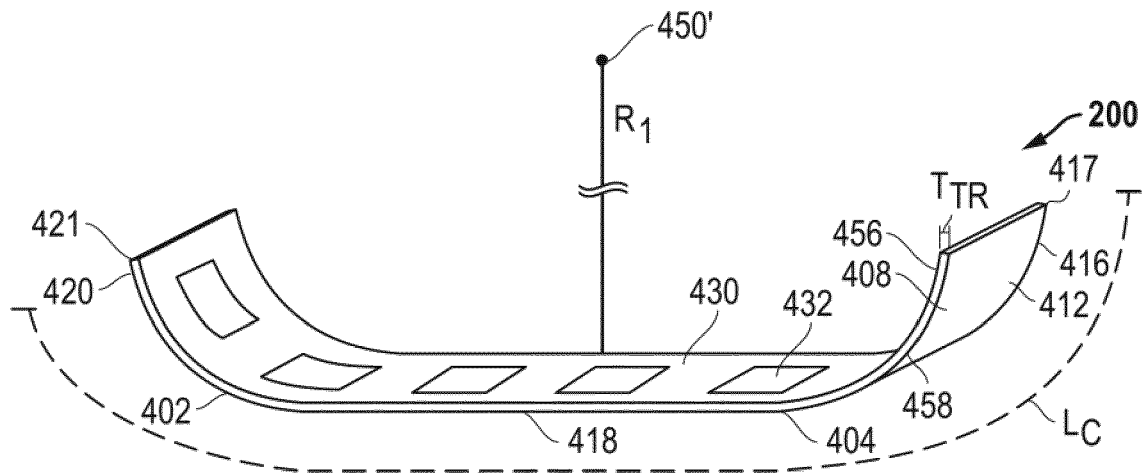
FIG. 4B includes a side perspective view of a tolerance ring in accordance with an embodiment.
Figure 4C:
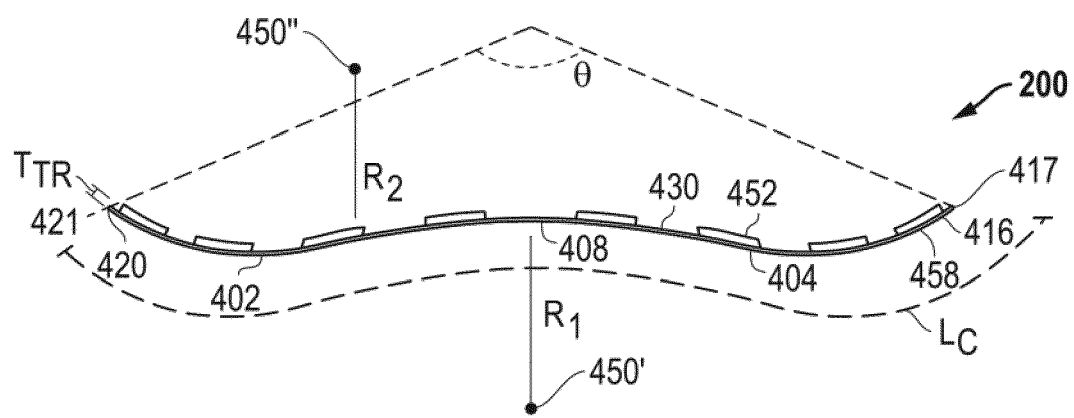
FIG. 4C includes a side perspective view of a tolerance ring in accordance with an embodiment.

Referring now to FIGS. 4A-4C, details concerning the tolerance ring 200 are illustrated. FIG. 4A illustrates a side perspective view of a tolerance ring in accordance with an embodiment. FIG. 4B illustrates a side perspective view of a tolerance ring in accordance with an embodiment. FIG. 4C illustrates a side perspective view of a tolerance ring in accordance with an embodiment. As depicted, the tolerance ring 200 can include a generally cylindrical body 402 oriented down a central axis 450. In a number of embodiment, the tolerance ring 200 or generally cylindrical body 402 may include a tolerance ring sidewall 404. The tolerance ring sidewall 404 may be a cylinder. The tolerance ring sidewall 404 may be semi cylindrical, or have an otherwise semi-cylindrical arc. The tolerance ring sidewall 404 can include a top 408 and a bottom 412. Further, the tolerance ring sidewall 404 can include a first end portion 416 defining a first circumferential end 417, and a second end portion 420 defining a second circumferential end 421. At least one of the first end portion 416 or the second end portion 420 may span at least 5% of a circumferential length $L_c$ of the tolerance ring 200, such as at least 10%, at least 20%, at least 25%, at least 30%, at least 35% or even at least 40% of the circumferential length $L_c$ of the tolerance ring 200. In a particular embodiment, the first end portion 416 may span the first 10% of the circumferential length $L_c$ of the tolerance ring 200 while the second end portion 420 may span the last 10% of the circumferential length $L_c$ of the tolerance ring 200. A middle portion 418 may connect the first end portion 416 and the second end portion 420. Further, the tolerance ring sidewall 404 may have a first axial surface 456 defining an inner radial edge 457 and the second axial surface 458 defining an outer radial edge 459. As shown in FIG. 4A, the middle portion 418 may be rounded inward from the ends forming a continuously curved arcuate shape of the generally cylindrical body 402. In an alternative embodiment, as shown in FIG. 4B, the middle portion 418 may be planar or flat forming a non-continuously curved arcuate shape of the generally cylindrical body 402. The middle portion 418 may be planar or flat across at least 50% of a circumferential length $L_c$ of the tolerance ring 200, such as at least 55%, at least 60%, at least 65%, at least 70%, at least 75% or even at least 80% of the circumferential length $L_c$ of the tolerance ring 200. In an alternative embodiment, as shown in FIG. 4C, the middle portion 418 may be rounded inward to form a convex portion while the ends may also be rounded inward forming a waved shape of the generally cylindrical body 402.

In a number of embodiments, as shown in FIGS. 2A-2D and 4A-4C, the tolerance ring 200 may have a particular thickness $T_{TR}$. For purposes of embodiments described herein, the thickness $T_{TR}$ of the tolerance ring 200 is the distance from the first axial surface 456 to the second axial surface 458. It will be appreciated that thickness $T_{TR}$ of the tolerance ring may be substantially similar or the same thickness as the material or composite material 1000, 1001, 1002, 1003 as shown in FIGS. 2A-2D. According to certain embodiment, the thickness $T_{TR}$ of the tolerance ring 200 may be at least about 0.1 mm or at least about 0.2 mm or at least about 0.3 mm or at least about 0.4 mm or even at least about 0.5 mm. According to still other embodiments, the $T_{TR}$ of the tolerance ring 200 may be not greater than about 1 mm, such as, not greater than about 0.9 mm or even not greater than about 0.8 mm. It will be appreciated that the thickness $T_{TR}$ of the tolerance ring 200 may be within a range between any of the minimum and maximum values noted above. It will be further appreciated that the thickness $T_{TR}$ of the tolerance ring 200 may be any value between any of the minimum and maximum values noted above. It can also be appreciated that the thickness $T_{TR}$ of the tolerance ring 200 may vary along its circumference. It can also be appreciated that thickness $T_{TR}$ of the tolerance ring 200 may vary along its circumference and may vary across a plurality of tolerance rings.

Referring to FIGS. 4A-4C, the tolerance ring 200 can include a plurality of waves (or bridges) 452 formed in the sidewall 404 of the body 402 or tolerance ring 200. As illustrated, in one aspect, the waves 452 can extend in an outward direction with respect to the central axis 450. However, in another aspect, the waves 452 can extend in an inward direction with respect to the central axis 450. The waves 452 can be formed, or otherwise arranged, in the sidewall 404 of the body 402 so that the tolerance ring 200 can include a plurality of elongated waves extending substantially along the length of the sidewall 404 and in a pattern such that the elongated waves 452 may be equally spaced circumferentially along the sidewall 404 of the body 402 of the tolerance ring 200. Further, the tolerance ring sidewall 404 can include a plurality of unformed sections 430. Each unformed section 430 can include a section of the sidewall 404 that extends between adjacent waves and may not be formed with any waves or other structures. The waves 452 and the unformed sections 430 can alternate around the circumference of each sidewall 404. Moreover, in a particular aspect, the waves 452 may be evenly spaced along the circumference of each sidewall 404 by the unformed sections 430 of each sidewall 404. The tolerance ring 200 can include a total number of waves, $W_T$. $W_T$ can be an even integer and $W_T$ can be ≥4 such as ≥6, ≥8, ≥10, ≥12, ≥14, ≥16, ≥18, or ≥20. Further, $W_T$ can be ≤500, ≤250, ≤100, ≤90, ≥80, ≤70, ≤60, or ≤50.

In a particular aspect, the balanced forces across the tolerance ring 200 for any pair of waves 452 can allow the tolerance ring 200 to provide a concentricity, C, can be ≤50 μm, where the concentricity is a distance measured between a center of the inner member 204, and a center of the outer member 206. In another aspect, C can be ≤45 μm, such as ≤40 μm, ≤35 μm, ≤30 μm, ≤25 μm, or ≤20 μm. C can also be ≥5 μm, such as ≥6 μm, ¢7 μm, ≥8 μm, ≥9 μm, ≥10 μm, ≥11 μm, ≥12 μm, ≥13 μm, ≥14 μm, or ≥15 μm. Further, C can be within a range between and including any of the values of C above. In a particular aspect, C can be measured after the tolerance ring is installed around an inner member 204 between the inner member 204 and an outer member 206.

In a number of embodiments, as shown in FIGS. 4A-4C, the tolerance ring 200 may have a circumferential length $L_c$ as measured in an arc length from the first circumferential edge 417 to the second circumferential edge 421. The circumferential length $L_c$ can be calculated by the formula $$L_C = \frac{C\theta}{360},$$

where $\Theta$ is the angle formed between the first circumferential edge 417 to the second circumferential edge 421 with respect to the central axis 450, and C is the circumference of the tolerance ring 200 along a best fit circle formed by inner radial edge 457 of the tolerance ring 200. It will be appreciated that the circumferential length $L_c$ may be substantially similar to the length of the material or composite material 1000, 1001, 1002, 1003 as shown in FIGS. 2A-2D. According to certain embodiment, the circumferential length $L_c$ of the tolerance ring 200 may be at least about 1 mm, such as, at least about 10 mm or at least about 30 mm or at least about 50 mm or at least about 100 mm or even at least about 500 mm. According to still other embodiments, the circumferential length $L_c$ of the tolerance ring 200 may be not greater than about 1000 mm, such as, not greater than about 500 mm or even not greater than about 250 mm. It will be appreciated that the circumferential length $L_c$ of the tolerance ring 200 may be within a range between any of the minimum and maximum values noted above. It will be further appreciated that the circumferential length $L_c$ of the tolerance ring 200 may be any value between any of the minimum and maximum values noted above. It can also be appreciated that circumferential length $L_c$ of the tolerance ring 200 may vary along its circumference and may vary across a plurality of tolerance rings.

In a number of embodiments, as shown best in FIG. 3, the tolerance ring 200 may have a particular inner radius of curvature $IR_{TR}$. For purposes of embodiments described herein, the inner radius of curvature, $IR_{TR}$ of the tolerance ring 200 is the distance from the central axis 450 to the inner radial edge 457. According to certain embodiment, the inner radius of curvature $IR_{TR}$ of the tolerance ring 200 may be at least about 10 mm or at least about 20 mm or at least about 30 mm or at least about 50 mm or even at least about 100 mm. According to still other embodiments, the inner radius of curvature $IR_{TR}$ of the tolerance ring 200 may be not greater than about 500 mm, such as, not greater than about 250 mm or even not greater than about 100 mm. It will be appreciated that the inner radius of curvature $IR_{TR}$ of the tolerance ring 200 may be within a range between any of the minimum and maximum values noted above. It will be further appreciated that the inner radius of curvature $IR_{TR}$ of the tolerance ring 200 may be any value between any of the minimum and maximum values noted above. It can also be appreciated that the inner radius of curvature $IR_{TR}$ of the tolerance ring 200 may vary along its circumference and may vary across a plurality of tolerance rings.

In a number of embodiments, as shown best in FIG. 3, the tolerance ring 200 may have a particular outer radius of curvature $OR_{TR}$. For purposes of embodiments described herein, the outer radius of curvature $OR_{TR}$ of the tolerance ring 200 is the distance from the central axis A to the outer radial edge 459. According to certain embodiment, the outer radius of curvature $OR_{TR}$ of the tolerance ring 200 may be at least about 10 mm or at least about 20 mm or at least about 30 mm or at least about 50 mm or even at least about 100 mm. According to still other embodiments, the outer radius of curvature $OR_{TR}$ of the tolerance ring 200 may be not greater than about 500 mm, such as, not greater than about 250 mm or even not greater than about 100 mm. It will be appreciated that the outer radius of curvature $OR_{TR}$ of the tolerance ring 200 may be within a range between any of the minimum and maximum values noted above. It will be further appreciated that the outer radius of curvature $OR_{TR}$ of the tolerance ring 200 may be any value between any of the minimum and maximum values noted above. It can also be appreciated that the outer radius of curvature $OR_{TR}$ of the tolerance ring 200 may vary along its circumference and may vary across a plurality of tolerance rings.

In a number of embodiments, as shown best in FIGS. 4A-4C, the tolerance ring 200 may have a first radius of curvature $R_1$, measured at a point, $X_1$, bisecting the circumferential length, $L_c$ of the tolerance ring 200 sidewall 404 to a center axis 450' for a best fit circle to that radius of curvature, as shown best in FIG. 4A. The tolerance ring 200 may have a second radius of curvature $R_2$, measured at a point, $X_2$, measured along one of the first and second end portions 416, 420 of the tolerance ring sidewall 404 to a center axis 450" for a best fit circle to that radius of curvature. In a number of embodiments, $R_2 \leq R_1$. Specifically, $|R_2|$ can be $\leq 75\%$ $|R_1|$, such as $|R_2| \leq 70\%$ $|R_1|$, $|R_2| \leq 65\%$ $|R_1|$, $|R_2| \leq 60\%$ $|R_1|$, $|R_2| \leq 55\%$ $|R_1|$ or $|R_2| \leq 50\%$ $|R_1|$. In another aspect, $|R_2|$ can be $\geq 25\%$ $|R_1|$, such as $|R_2| \geq 30\%$ $|R_1|$, $R_2 \geq 35\%$ $|R_1|$, or $R_{2\geq} 40\%$ $|R_1|$. In another aspect, $|R_2|$ can be within a range between, and including, any of the percentage values of $|R_1|_{disclosed}$ above. In a particular embodiment, 0.5 $|R_1|$ may be greater than $|R_2|$, such as 0.1 $|R_1|$ may be greater than $|R_2|$, or $0.01|R_1|$ may be greater than $|R_2|$. In other embodiments, $|R_1|$ may differ by at least 10% of $|R_2|$, such as at least 20% of $|R_2|$, at least 30% of $|R_2|$, or at least 40% of $|R_2|$. These ranges may be reflected in any of the tolerance rings disclosed herein including the continuously curved arcuate shape tolerance ring 200 of FIG. 4A, the non-continuously curved arcuate shape tolerance ring 200 of FIG. 4B, or the waved shape tolerance ring 200 of FIG. 4C. In a number of embodiments, as shown in the non-continuously curved arcuate shape tolerance ring 200 of FIG. 4B, $R_1$ may have a radius of curvature that is infinite. In a number of embodiments, particularly for the waved shape tolerance ring 200 as shown in FIG. 4C, $R_1$ may be negative while $R_2$ is positive.

Figures 7A, 7B:
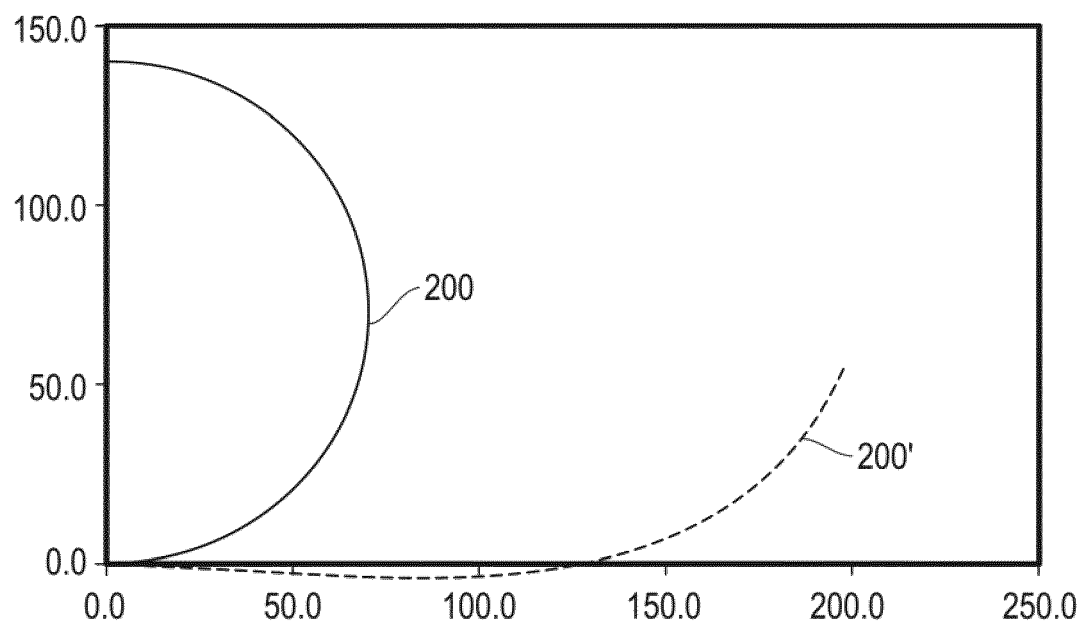
FIG. 7A includes a table of position along the radius of curvature for a tolerance ring vs. position along its circumference in accordance with an embodiment.
FIG. 7B includes a graph showing deformation of a plurality of tolerance rings in accordance with an embodiment.

In a number of embodiments, the tolerance ring 200 may have more than two different radii of curvature. In a number of embodiments, as shown in FIGS. 7A-7B, the tolerance ring 200, 200' may have more than two different radii of curvature running from the radius of curvature bisecting the circumferential length, $L_c$ of the tolerance ring 200 sidewall 404 toward each end portion 416, 420. FIG. 7A shows a non-limiting example of a table of different radii of curvature based on the position about a tolerance ring 200 with a circumferential length, $L_c$, of 220 mm. As shown, the radius of curvature gets progressively tighter toward the each end portion 416, 420. In a number of embodiments, the radii of curvature around the circumferential length, $L_c$ of the tolerance ring 200 may blend continuously, forming different values around their circumference. For example, the radii of curvature at a set point may vary from the marker points shown in FIG. 7B. FIG. 7B includes a graph showing deformation of a plurality of tolerance rings in accordance with an embodiment. FIG. 7B illustrates two different tolerance rings 200, 200', where tolerance ring 200 is in the installed state and tolerance ring 200' is in the uninstalled, unbiased state. In this way, the tolerance ring 200 may have a plurality of different radii of curvature along its circumferential length, $L_c$.

Referring back to FIGS. 3-4C, the tolerance ring 200 within an assembly 500 in accordance with embodiments described herein may have an uninstalled, unbiased state where the tolerance ring has a circumferential (arc) length $L_c$ that spans an arc that is 10° or greater, such as 15° or greater, 20° or greater, 30° or greater, or 45° or greater. Further in accordance with embodiments described herein may have an uninstalled, unbiased state where the tolerance ring has a circumferential (arc) length $L_c$ that spans an arc that is 180° or less, such as 150° or less, 120° or less, 90° or less, or 45° or less. The tolerance ring may be installed between the inner member 204 and member 206 of the assembly to form an installed state where the tolerance ring 200 deforms upon deployment between an inner member 204 and an outer member 206 to have a circumference that spans at least 300°. In other words, the tolerance ring may deform to better surround the inner member 204 within the assembly 500, as shown best in FIG. 3. This may be done by having a circumferential length, $L_c$, which may be greater than the circumference of the inner member 204, and fitting and forming the deformable material or composite material 1000, 1001, 1002, 1003 around the inner member 204 within the assembly 500.

Figure 5:
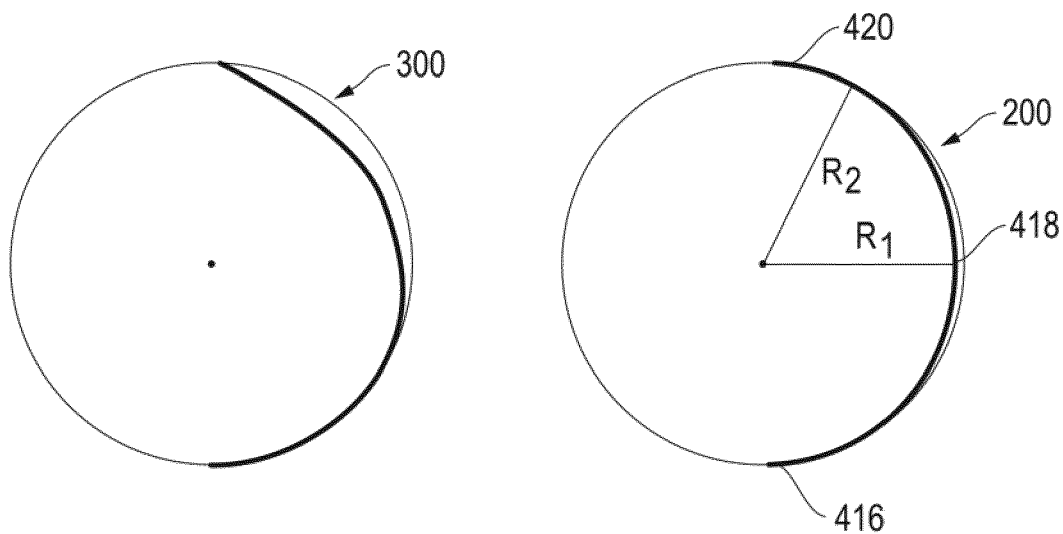
FIG. 5 includes an installation top view of a tolerance ring in accordance with an embodiment compared to a prior art tolerance ring.

FIG. 5 shows an installation top view of a tolerance ring 200 in accordance with an embodiment compared to a prior art tolerance ring 300. Under step 14 of FIG. 1, the ends of the material or composite material are curled to form a tolerance ring 200. As shown in FIG. 5, the tolerance ring 200 of the embodiments disclosed herein forms a more perfect fit against a best fit circle going from an unbiased, uninstalled state to an installed state between an inner component 204 and an outer component 206 compared to a prior art tolerance ring. Specifically, a tolerance ring 200 of the embodiments disclosed herein provides less deviation at the spaces of the tolerance ring sidewall 404 between the middle portion 418 and the end portions 416, 420 upon curling the ends to form a more conformal ring 200 with the bore 202 of an assembly 500. This is because the ends of the tolerance ring 200 are curled to form first and second end portions 416, 420 that better modify to fit the bore 202 within an assembly 500 between the inner component 204 and the outer component 206. The deviation may be defined herein as the maximum distance between either of 1) the outer surface of the inner component 204 and the inner radial edge 457 of a tolerance ring 200, or 2) the inner surface of the outer component 206 and the outer radial edge 459 of the tolerance ring 200, measured perpendicular to the surfaces of the inner or outer component 204, 206 prior to the second mating component being installed within the assembly. For example, FIG. 5 shows the deviation from the best fit of the inner surface of the outer component 206 with the outer radial edge 459 of the tolerance ring 200 disclosed in embodiments herein and the tolerance ring 300 of the prior art. The higher the deviation, the greater the risk associated with sizing issues within the assembly 500 that may lead to undesired wear, noise, or vibration, which may decrease the lifetime use of the tolerance ring 200 or other components of the assembly. The deviation may range from 0.05 to 1 mm.

A method may be included in this process including: providing an inner member 204; providing an outer member 206; providing a tolerance ring 200 between the inner member 204 and the outer member 206, the tolerance ring 200 including a tolerance ring sidewall 404 in an uninstalled, unbiased state where the tolerance ring 200 has a circumference that spans 180° or less; and deforming the tolerance ring 200 upon deployment between the inner member 204 and the outer member 206 to have a circumference that spans at least 300°. As stated above, the tolerance ring 200 may be deployed around the inner member 204 with the outer member 206 deployed around the tolerance ring 200 thereafter. In the alternative, the tolerance ring 200 may be deployed within the outer member 206 with the inner member 204 deployed within the tolerance ring 200 thereafter.

Figure 6:
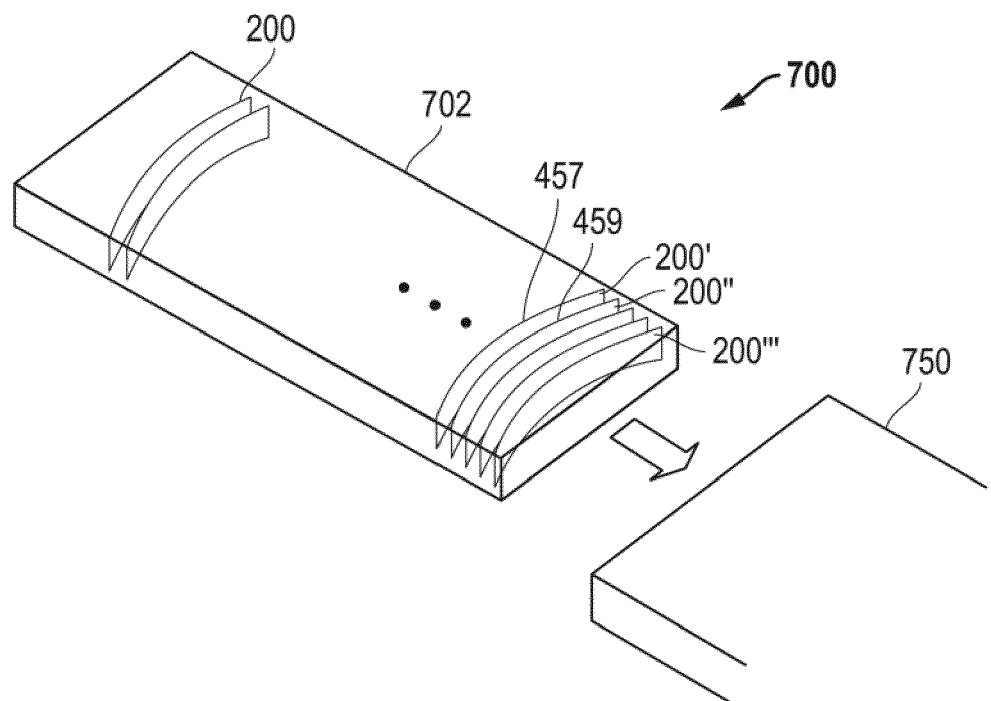
FIG. 6 includes a top view of a packaged article including a plurality of tolerance rings in accordance with an embodiment.

FIG. 6 illustrates a top view of a packaged article 700 including a plurality of tolerance rings 200, 200', 200", 200"' in accordance with an embodiment. The packaged article 700 may include a package 702. The package 702 may house, support, or otherwise contact a plurality of tolerance rings 200, 200', 200", 200"' as described with embodiments herein. The plurality of tolerance rings 200, 200', 200", 200"' may be nested in the package 702 such that the form semi-circular arcs or tolerance rings having continuously curved arcuate shapes (as shown in FIG. 4A), non-continuously curved arcuate shapes (as shown in FIG. 4B), or waved shapes (as shown in FIG. 4C), and as described with embodiments herein. The plurality of tolerance rings 200, 200', 200", 200"' may be nested in the package 702 such that the inner radial edge 457 of a tolerance ring 200' may contact or be in close proximity to the outer radial edge 459 of another tolerance ring 200". In this way the package 702 may act as a cartridge that provides for storing, shipping, and feeding the tolerance rings 200, 200', 200", 200"' for use in assemblies 500. The package 702 may house, support, or otherwise contact at least 10 tolerance rings, such as at least 15 tolerance rings, or at least 20 tolerance rings. In a number of embodiments, the packaged article 700 may be adapted to interface with a mechanized structure component 750 to repeatedly remove and manipulate the tolerance rings 200, 200', 200", 200"' for use in assemblies 500. The mechanized structure component 750 may remove the tolerance rings 200, 200', 200", 200"' at a faster rate than another tolerance ring storage concept.

In an embodiment, the assembly 500 can be installed or assembled by an assembly force of at least 10 N a longitudinal direction relative to the inner member 204, such as at least 20 N, at least 30 N, at least 40 N, at least 50 N, at least 100 N, or even at least 150 N. In a further embodiment, the assembly 500 can be installed or assembled by an assembly force of at least 1 kgf in a longitudinal direction relative to the inner member 204, such as no greater than 1500 N, no greater than 1000 N, no greater than 750 N, or even no greater than 250 N.

Use of the tolerance ring 200, packaged article 700, assembly 500, or method as described herein may provide increased benefits in several applications such as, but not limited to, rotor and stator, such as generator assemblies (including, but not limited to, alternator assemblies), motor assemblies (including, but not limited to, electric motor assemblies), engine assemblies, clutch assemblies, or holding mechanisms or other types of applications. Notably, the use of the tolerance ring 200 may provide a simplification of the assembly 500 by eliminating components. Further, use of the tolerance ring 200 may improve assembly forces required, compensate for axial, radial, or circumferential tolerances at a satisfactory deviation between the inner and outer members 204, 206, and provide noise reduction, damping, and vibration decoupling within the assembly 500 by preventing undesired movement between the inner and outer members 204, 206. Further, the tolerance ring 200 may be a simple installation and be retrofit to existing components and cost effective across several possible assemblies of varying complexity. Further, the use of packaged article 700 or method may increase packing density of the tolerance rings 200 and eliminates or decreases risk of entanglement and facilitates the use of automated process for packing, unpacking, and assembling assemblies 500 including the tolerance rings 200, reducing waste of time, materials, and assembly manpower. Further, the tolerance ring 200, packaged article 700, assembly 500, or method may provide ease of convenience and customer fit. Lastly, the use of the tolerance ring 200 may maintain the improved stiffness and tensile strength between the inner and outer members 28, 30, increasing the lifetime of the assembly 500.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A tolerance ring comprising: a tolerance ring sidewall comprising a plurality of waves extending at least one of radially inward or outward and having first and second end portions terminating at first and second ends, respectively, wherein the tolerance ring has a first radius of curvature, $R_1$, measured at a point bisecting a circumferential length, $L_c$ of the tolerance ring sidewall, and a second radius of curvature, $R_2$, measured along one of the first and second end portions of the tolerance ring sidewall, and wherein at least one of: 1) $R_1$ is greater than $R_2$, or 2) wherein $R_1$ is negative and $R_2$ is positive.

Embodiment 2

A tolerance ring comprising: a tolerance ring sidewall comprising a plurality of waves extending at least one of radially inward or outward and having first and second end portions terminating at first and second ends respectively, wherein in an uninstalled, unbiased state the tolerance ring has a circumference that spans 180° or less, and wherein in an installed state the tolerance ring deforms upon deployment between an inner member and an outer member to have a circumference that spans at least 300°.

Embodiment 3

A packaged article comprising: a package; and a plurality of tolerance rings nested in the package, wherein the tolerance rings each comprise a plurality of waves extending at least one of radially inward or outward and having first and second end portions terminating at first and second ends, respectively, wherein each tolerance ring has a circumference that spans 180° or less.

Embodiment 4

An assembly comprising: an inner member; an outer member; a tolerance ring disposed between the inner member and the outer member, the tolerance ring comprising a tolerance ring sidewall comprising a plurality of waves extending at least one of radially inward or outward and having first and second end portions terminating at first and second ends, respectively, wherein in an uninstalled, unbiased state, the tolerance ring has a circumference that spans 180° or less, and wherein in an installed state the tolerance ring deforms upon deployment between the inner member and the outer member to have a circumference that spans at least 300°.

Embodiment 5

A method comprising: providing an inner member; providing an outer member; providing a tolerance ring between the inner member and the outer member, the tolerance ring comprising a tolerance ring sidewall comprising a plurality of waves extending at least one of radially inward or outward and having first and second end portions terminating at first and second ends, respectively, wherein in an uninstalled, unbiased state the tolerance ring has a circumference that spans 180° or less; and deforming the tolerance ring upon deployment between the inner member and the outer member to have a circumference that spans at least 300°.

Embodiment 6

The tolerance ring of embodiment 1, wherein 0.5 $|R_1|$ is greater than $|R_2|$, such as 0.1 $|R_1|$ is greater than $|R_2|$, or 0.01 $|R_1|$ is greater than $|R_2|$.

Embodiment 7

The tolerance ring of embodiment 6, wherein $|R_1|$ differs by at least 10% of $|R_2|$.

Embodiment 8

The tolerance ring of embodiment 2, wherein the tolerance ring sidewall comprises a single unitary strip of material.

Embodiment 9

The packaged article of embodiment 3, wherein the packaged article is adapted to interface with a mechanized structure component to repeatedly remove and manipulate tolerance rings.

Embodiment 10

The packaged article of embodiment 3 or 9, wherein the plurality of tolerance rings comprises at least 10 tolerance rings, such as at least 15 tolerance rings, or at least 20 tolerance rings.

Embodiment 11

The tolerance ring, packaged article, or method of any of the preceding embodiments, wherein the tolerance ring comprises a substrate.

Embodiment 12

The tolerance ring, packaged article, or method of embodiment 11, wherein the substrate comprises a metal.

Embodiment 13

The tolerance ring, packaged article, or method of embodiment 12, wherein the substrate comprises steel or stainless steel.

Embodiment 14

The tolerance ring, packaged article, or method of any of embodiments 11-13, wherein the tolerance ring further includes a coating overlying the substrate.

Embodiment 15

The tolerance ring, packaged article, or method of embodiment 14, wherein the coating comprises a damping material.

Embodiment 16

The tolerance ring, packaged article, or method of embodiment 14, wherein the coating comprises a heat transfer material.

Embodiment 17

The tolerance ring, packaged article, or method of embodiment 14, wherein the coating comprises a corrosion protection material.

Embodiment 18

The tolerance ring, packaged article, or method of embodiments 14-17, wherein the tolerance ring further comprises an adhesive layer between the substrate and the coating.

Embodiment 19

The tolerance ring, packaged article, or method of embodiment 18, wherein the adhesive layer comprises epoxy resins, polyimide resins, polyether/polyamide copolymers, ethylene vinyl acetates, ETFE copolymer, or any combination thereof.

Embodiment 20

The tolerance ring, packaged article, or method of any of the preceding embodiments, wherein the tolerance ring has a continuously curved arcuate shape. Embodiment 21. The tolerance ring of any one of embodiments 1, 6, or 11 to 20, wherein the tolerance ring has a circumferential length $L_c$ that spans an arc that is 10° or greater, such as 15° or greater, 20° or greater, 30° or greater, or 45° or greater.

Embodiment 22

The tolerance ring, packaged article, or method of any of the preceding embodiments, wherein the tolerance ring has a non-continuously curved arcuate shape.

Embodiment 23

The tolerance ring, packaged article, or method of any of the preceding embodiments, wherein the tolerance ring has a waved shape.

Embodiment 24

The tolerance ring, packaged article, or method of any of the preceding embodiments, wherein the tolerance ring has a deviation from the outer surface of the inner component or the inner surface of the outer component in the range of 0.05 to 1 mm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A tolerance ring comprising:
a tolerance ring sidewall comprising a plurality of waves extending at least one of radially inward or outward and having first and second end portions terminating at first and second ends, respectively, wherein the tolerance ring has a first radius of curvature, $R_1$, measured at a point bisecting a circumferential length, $L_c$, of the tolerance ring sidewall, and a second radius of curvature, $R_2$, measured along one of the first and second end portions of the tolerance ring sidewall, and wherein at least one of: 1) $R_1$ is greater than $R_2$, or 2) wherein $R_1$ is negative and $R_2$ is positive.

2. The tolerance ring of claim 1, wherein 0.5 $|R_1|$ is greater than $|R_2|$.

3. The tolerance ring of claim 2, wherein $|R_1|$ differs by at least 10% of $|R_2|$.

4. The tolerance ring of claim 1, wherein the tolerance ring comprises a substrate.

5. The tolerance ring of claim 4, wherein the substrate comprises a metal.

6. The tolerance ring of claim 4, wherein the substrate comprises steel or stainless steel.

7. The tolerance ring of claim 4, wherein the tolerance ring further includes a coating overlying the substrate.

8. The tolerance ring of claim 7, wherein the coating comprises a damping material.

9. The tolerance ring of claim 7, wherein the coating comprises a heat transfer material.

10. The tolerance ring of claim 7, wherein the coating comprises a corrosion protection material.

11. The tolerance ring of claim 7, wherein the tolerance ring further comprises an adhesive layer between the substrate and the coating.

12. The tolerance ring of claim 11, wherein the adhesive layer comprises epoxy resins, polyimide resins, polyether/polyamide copolymers, ethylene vinyl acetates, ETFE copolymer, or any combination thereof.

13. The tolerance ring of claim 1, wherein the tolerance ring has a circumferential length $L_c$ that spans an arc that is 10° or greater, such as 15° or greater, 20° or greater, 30° or greater, or 45° or greater.

* * * * *